Dec. 18, 1962 C. G. GALLOWAY ETAL 3,068,853
VAPOR PRODUCING ORCHARD HEATER
Filed April 7, 1961 2 Sheets-Sheet 1

INVENTORS
CHARLES G. GALLOWAY,
CLINTON E. GALLOWAY,
BY
McMorrow, Berman & Davidson
ATTORNEYS.

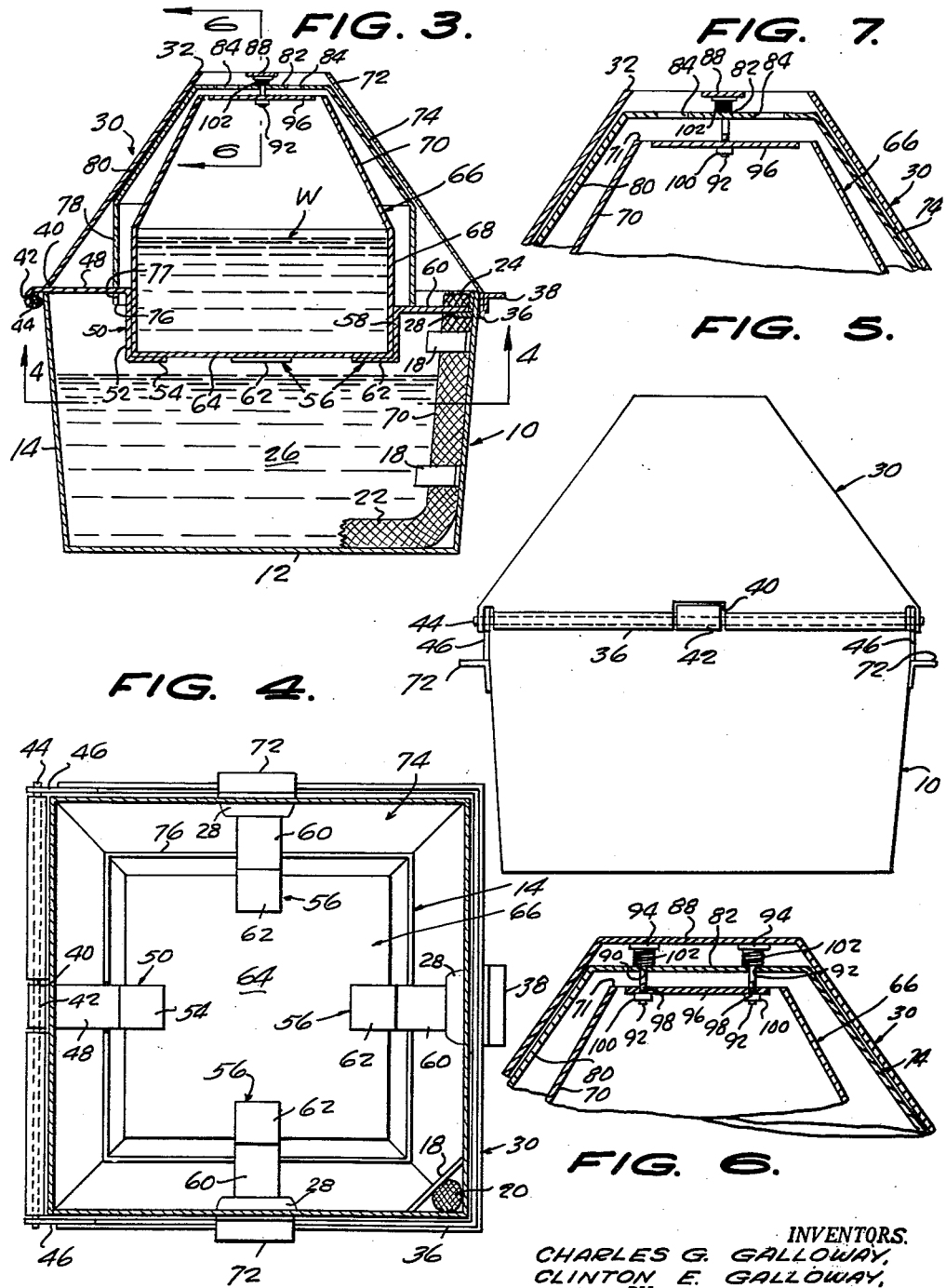

United States Patent Office 3,068,853
Patented Dec. 18, 1962

3,068,853
VAPOR PRODUCING ORCHARD HEATER
Charles G. Galloway and Clinton E. Galloway, both of Rte. 1, Box 185, Benton City, Wash.
Filed Apr. 7, 1961, Ser. No. 101,575
8 Claims. (Cl. 126—59.5)

This invention relates to a novel orchard heater of the type which supplies heated water vapor as well as dry heat to the trees.

The primary object of the invention is the provision of a simpler, less costly, more efficient, more practical, and more easily used device of the kind indicated, the use of which, in sufficient numbers, in an orchard, adequately heats the air around the trees, and, in addition provides an adequate amount of warm water vapor, for contact with the blossoms of the trees, to prevent freezing thereof in cold weather.

Another object of the invention is the provision of a device of the character indicated above, wherein an openable cover is provided in closure relationship to an oil burning fire pot and to a vaporizing water container mounted therein, in an arrangement whereby closing of the cover serves to extinguish oil burning in the firepot and to channel steam from the top of a water container into the firepot to commingle with the products of combustion therein, and wherein spring-closed closure means is provided, in conjunction with a jacket surrounding the container, which closure means is responsive to opening of the cover to close and provide such channeling of the steam and for controlled discharge of vapor from the heater.

A further object of the invention is the provision of a device of the character indicated above, wherein a jacket surrounds and encloses the container and is imperforate, except for vapor discharge opening means, at its upper end, through which discharge of vapor to the air is controlled by said closure means.

A still further object of the invention is the provision of a heater of the character indicated above, which is provided with a cover, which is in open position during normal operation of the heater and while the oil in the firepot is burning, and wherein closing the cover extinguishes the fire but provides, for some time thereafter, discharge of defrosting vapor from the heater due to residual heat in the water container.

Other important objects and advantageous features of the invention will be apparent from the following description and the accompanying drawings, wherein, for purposes of illustration only, a specific form of the invention is set forth in detail.

In the drawings:

FIGURE 3 is a vertical transverse section taken on the line 3—3 of FIGURE 1, showing the cover in closed position;

FIGURE 4 is a horizontal section taken on the line 4—4 of FIGURE 3;

FIGURE 5 is a side elevation of the device, taken from the left in FIGURE 4;

FIGURE 6 is an enlarged fragmentary vertical transverse section taken on the line 6—6 of FIGURE 3, showing the closure plate for the steam discharge means of the jacket in depressed open position, and FIGURE 7 is a view like FIGURE 6, but taken at right angles to FIGURE 6.

Figure 1:
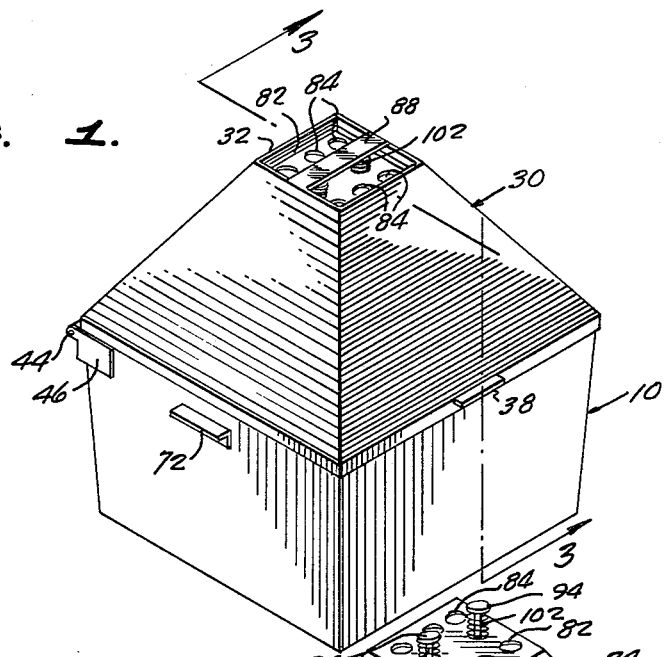
FIGURE 1 is a perspective view of a device of the present invention.

Referring in detail to the drawings, wherein like numerals designate like parts throughout the several views, the illustrated device comprises an open-top firepot 10 having a flat bottom wall 12 and an upstanding, upwardly flaring sidewall 14. While the firepot 10 is illustrated as being square, it and the other components of the device are not restricted to this shape, but can be elongated rectangular, polygonal, circular, or oval if desired. Vertically spaced straps 18 are secured to the sidewall 14, across a corner thereof, which retain in position a vertically elongated wick 20, which has a lower portion 22 lying upon the bottom wall 12, and an upper end 24 on a level with the upper edge of the firepot. As shown in FIGURE 3, the firepot 10 is adapted to contain a quantity of a suitable combustible liquid 26 to a line near the top of the firepot, which is adapted to be quickly and efficiently ignited, simply by applying a flame to the upper end 24 of the wick 20.

A pyramidical cover 30, having an open upper end 32, has an open lower end which is slightly larger in area than the upper end of the firepot 10, and has a depending peripheral flange 36, adapted to telescope onto the upper end of the firepot, as shown in FIGURE 3, in the closed position of the cover. The flange 36 has, on one side of the cover 30, a lateral handle 38. The side of the flange 36, opposite the handle 38 is formed, upwardly from its lower edge, with a recess 40, which affords clearance for a hinge barrel 42, which is journaled on the middle of a hinge rod 44 which is spaced parallel to and is positioned laterally outwardly from the firepot sidewall 14, and is supportably engaged, at its ends, in lugs 46. The lugs 46 are suitably fixed on the outer surfaces of opposed parts of the firepot sidewall 14. The hinge barrel 42 is fixed on the laterally outward end of the horizontal arm 48 of a reclining L-shaped bracket 50, the arm 48 bearing upon the upper edge of the firepot and extending through the recess 40. The bracket 50 has a depending vertical arm 52, on the inner end of the horizontal arm 48, which terminates at its lower end, in a short inwardly extending horizontal foot 54.

Three other inclining L-shaped brackets 56 positioned adjacent three angle irons 28 which are positioned in spaced relation about the upper edge of the side wall 14, one of the angle irons 28 being disposed opposite to the part of the side wall 14 supporting the hinge rod 44 and the other two being disposed on the parts of the side wall on opposite sides of the part of the side wall carrying the hinge rod 44. The brackets 56 have vertical arms 58, shorter than the vertical arm 52 of the bracket 50, and horizontal arms 60, shorter than the horizontal arm 48 of the bracket 50, the foot 54 of the bracket 50 and the feet 62 of the brackets 56 being suitably secured to the underside of the flat horizontal bottom wall 64, of a water container 66. While the bracket 50 bears upon the upper edge of the firepot 10, as above described, the horizontal arms 60 of the brackets 56 rest upon the brackets 28, at equally spaced intervals around the firepot 10.

Figure 2:
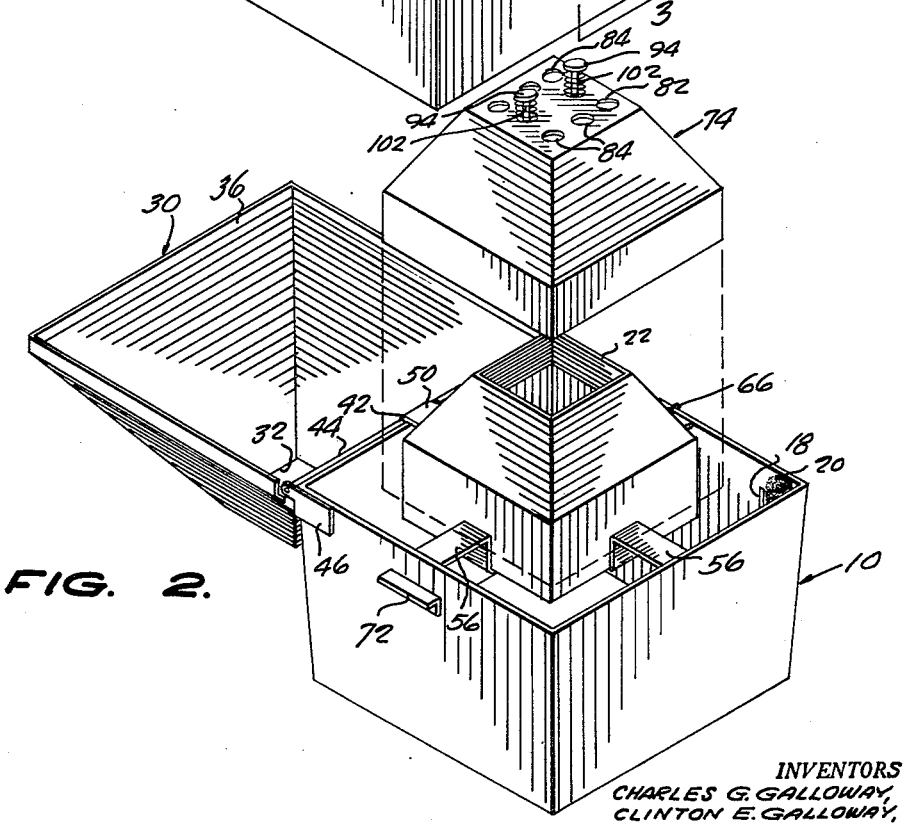
FIGURE 2 is an exploded perspective view of said device, its cover being in open position.

The water container 66 is concentrically spaced relative to the sidewall 14 of the firepot 10, and preferably has the same cross section as the firepot. The container 66 has a sidewall which is composed of perpendicular, parallel spaced lower portions 68 and upwardly convergent flat upper portions 70, whose upper edges 71 define a top opening for the container. The container 66 is adapted to be partly filled with water W, as indicated in FIGURE 3, and can be emptied of water, when desired, simply by tipping over the firepot 10, with the container in place thereon and with the cover 30, in the open position, as shown in FIGURE 2, or by swinging the container 66 about the hinge rod 44 over the upper edge of the firepot 10, thereby dumping the container. The firepot 10 has external lateral handles 72 on opposed parts of its sidewall 14, which are usable for carrying the device and for tipping the same, to remove water from the container and for removing oil from the firepot.

A jacket 74 for directing steam into the firepot 10, from the upper end of the container 66, surrounds and spacedly encloses the water container 66, and rests removably upon the horizontal arms of the brackets 50 and 56. The jacket is preferably of the same horizontal cross section as the container 66 and has an open lower end 76 which is larger in area than the lower portion of the container 66, and has a notch 77 to accommodate the horizontal arm 48 of the bracket 50. The jacket has a sidewall which comprises parallel perpendicular lower portions 78 and flat upwardly convergent upper portions 80. The convergent upper portions 80 flare downwardly away from the convergent upper sidewall portions 70 of the container 66, and are spaced from the cover 30, and at their upper ends, closely approach the upper end of the cover 30, as shown in FIGURES 3, 6 and 7.

The jacket 74 has a flat horizontal top wall 82 formed with laterally spaced rows of vapor discharge holes 84, located along opposed edges thereof. A centered relatively narrow flat bar 88 extends across the open upper end of the cover 30, and is located in the space between the rows of vapor discharge holes 84 in the jacket top wall 82.

In line with the cover bar 88, the jacket top wall 82 is provided with longitudinally spaced holes 90 through which vertical bolts 92 extend, which have enlarged heads 94, on their upper ends, adapted to bear against the underside of the bar 88, when the cover 30 is in closed position, as shown in FIGURE 6. A horizontal closure plate 96, smaller in area than and positioned spacedly in the open upper end of the container 66, is fixed on the lower ends of the bolts 92, as with the bolts threaded through openings 98 provided in the closure plate 96, in addition to nuts 100 on the lower ends of the bolts. Coil springs 102 are circumposed on the bolts 92 and are compressed between the cover 88 and the jacket top wall 82, whereby, when the cover 30 is in closed position, the springs 102 are compressed and, as shown in FIGURE 7, the closure plate 96 is displaced below the jacket top wall 82 and uncovers the vapor discharge holes 84, so that water vapor generated in the container 60 can pass upwardly through the holes 84 and discharge into the surrounding atmosphere through the open top of the cover 30 for contact with orchard trees, in the manner and for the purpose outlined hereinabove.

With the foregoing arrangement, the cover 30 being in its open position and the closure plate 96 being in closing relation to the holes 84 the steam rising through the open top of the container 60 is forced to pass downwardly, between the container and the jacket 74, into the flames in the firepot 10, and commingles with the products of combustion in the firepot, so as to produce more complete burning of these products, and thereby render the heater desirably a practically smokeless and more economical heater.

It is to be noted, in this connection, that even after the oil fire in the firepot 10 has been extinguished by closing the cover 30, sufficient heat remains in the water container 66, and in the water therein, to provide for beneficial discharge of water vapor into the atmosphere from the container 66 and the open top of the cover 30 for some time thereafter, thereby reducing the consumption of oil. It will also be noted that when the cover 30 is in closed position, the cover affords substantial protection of the firepot 10, from rain and airborne dust and the like, so that the device can be left out in an orchard during showers and wind storms, without substantial impairment of the combustible condition of the oil in the firepot 10, and with total protection of water present in the container 66.

It will be understood from the foregoing that when the heater is in normal operation for defrosting an orchard, the cover 30 is in open position, but that even when the cover has been closed and the oil fire is extinguished, the heater continues to provide defrosting vapor for some time thereafter through the open top of the cover.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A vapor producing orchard heater comprising an open top firepot to contain combustible fluid, a water container, means concentrically supporting the container within the open top of the firepot, said container having an open upper end, a jacket spacedly surrounding said container and resting upon said supporting means, said jacket having a top wall spaced above the upper end of the container, said top wall being provided with vapor discharge opening means, a closure plate within said container, and spring means for elevating the closure plate to said top wall for closing the vapor discharge opening means.

2. A vapor producing orchard heater comprising an open top firepot to contain combustible fluid, a water container, means concentrically supporting the container within the open top of the firepot, said container having an open upper end, a jacket spacedly surrounding said container and resting upon said supporting means, said jacket having a top wall spaced above the upper end of the container, said top wall being provided with vapor discharge opening means, a closure plate within said container, and spring means for elevating the closure plate to said top wall for closing the vapor discharge opening means, said spring means having an element extending above the jacket top wall, and a cover adapted to rest upon said firepot and enclose the firepot, the container, and the jacket, said cover having an open upper end, and means on said upper end for engaging and depressing said element and depressing the closure plate relative to said top wall and opening the discharge opening means.

3. A vapor producing orchard heater comprising an open top firepot to contain combustible fluid, a water container, means concentrically supporting the container within the open top of the firepot, said container having an open upper end, a jacket spacedly surrounding said container and resting upon said supporting means, said jacket having a top wall spaced above the upper end of the container, said top wall being provided with vapor discharge opening means, a closure plate within said container, and spring means for elevating the closure plate to said top wall for closing the vapor discharge opening means, said spring means having an element extending above the jacket top wall, and a cover adapted to rest upon said firepot and enclose the firepot, the container and the jacket, said cover having an open upper end, and means on said upper end for engaging and depressing said element and depressing the closure plate relative to said top wall and opening the discharge opening means, the cover being hinged on the firepot.

4. A vapor producing orchard heater comprising an open top firepot to contain combustible fluid, a water container, means concentrically supporting the container within the open top of the firepot, said container having an open upper end, a jacket spacedly surrounding said container and resting upon said supporting means, said jacket having a top wall spaced above the upper end of the container, said top wall being provided with vapor discharge opening means, a closure plate within said container, and spring means for elevating the closure plate to said top wall for closing the vapor discharge opening means, the firepot having a side wall having an upper edge, said supporting means comprising internal brackets on opposed portions of said sidewall, and lateral brackets fixed to said container, some of said lateral brackets bearing upon said internal brackets, one of said lateral brackets bearing upon the cover being hinged on said one bracket.

5. A vapor producing orchard heater comprising an open top firepot to contain combustible fluid, a water container, means concentrically supporting the container within the open top of the firepot, said container having an open upper end, a jacket spacedly surrounding said container and resting upon said supporting means, said jacket having a top wall spaced above the upper end of the container, said top wall being provided with vapor discharge opening means, a closure plate within said container, and spring means for elevating the closure plate to said top wall for closing the vapor discharge opening means, said container having an upwardly tapering sidewall, said jacket having an upwardly tapering sidewall larger in diameter than and concentrically spaced from the container sidewall, said vapor discharge opening means comprising laterally spaced rows of discharge holes.

6. A vapor producing orchard heater comprising an open top firepot to contain combustible fluid, a water container, means concentrically supporting the container within the open top of the firepot, said container having an open upper end, a jacket spacedly surrounding said container and resting upon said supporting means, said jacket having a top wall spaced above the upper end of the container, said top wall being provided with vapor discharge opening means, a closure plate within said container, and spring means for elevating the closure plate to said top wall for closing the vapor discharge opening means, said container having an upwardly tapering sidewall, said jacket having an upwardly tapering sidewall larger in diameter than and concentrically spaced from the container sidewall, said vapor discharge opening means comprising laterally spaced rows of discharge holes, said spring means comprising spaced bolts located between said rows, said jacket top wall having holes passing the bolts, said closure plate being fixed on the bolts below the jacket top wall, said bolts having enlarged heads above said top wall, and said springs being circumposed on the bolts and compressed between said heads and the jacket top wall.

7. A vapor producing orchard heater comprising an open top firepot to contain combustible fluid, a water container, means concentrically supporting the container within the open top of the firepot, said container having an open upper end, a jacket spacedly surrounding said container and resting upon said supporting means, said jacket having a top wall spaced above the upper end of the container, said top wall being provided with vapor discharge opening means, a closure plate within said container, and spring means for elevating the closure plate to said top wall for closing the vapor discharge opening means, said container having a upwardly tapering sidewall, said jacket having an upwardly tapering sidewall larger in diameter than and concentrically spaced from the container sidewall, said vapor discharge opening means comprising laterally spaced rows of discharge holes, said spring means comprising spaced bolts located between said rows, said jacket top wall having holes passing the bolts, said closure plate being fixed on the bolts below the jacket top wall, said bolts having enlarged heads above said top wall, and said springs circumposed on the bolts and compressed between said heads and the jacket top wall, a removable cover spacedly surrounding the jacket and supported on the firepot in its closed position, said cover having an open upper end spaced above the jacket top wall, a narrow bar extending across the open upper end of the cover and bearing upon the bolt heads and displacing the closure plate downwardly relative to the jacket top wall and opening the discharge openings.

8. A vapor producing orchard heater comprising an open top firepot to contain combustible fluid, a water container, means concentrically supporting the container within the open top of the firepot, said container having an open upper end, a jacket spacedly surrounding said container and resting upon said supporting means, said jacket having a top wall spaced above the upper end of the container, said top wall being provided with vapor discharge opening means, a closure plate within said container, and spring means for elevating the closure plate to said top wall for closing the vapor discharge opening means, and a vertically extending wick secured to the firepot sidewall, said wick having a lower portion on the bottom of the firepot and upper end located at the open top of the firepot.

References Cited in the file of this patent

UNITED STATES PATENTS

| | | |
|---|---|---|
| 826,067 | Smith | July 17, 1906 |
| 1,024,633 | Johnson | Aug. 30, 1912 |